(12) United States Patent
Pyo

(10) Patent No.: US 10,602,122 B2
(45) Date of Patent: Mar. 24, 2020

(54) MONOCULAR STEREOSCOPIC CAMERA

(71) Applicant: YEON SYSTEMS CO., LTD., Seoul (KR)

(72) Inventor: Do-Yeon Pyo, Goyang-si (KR)

(73) Assignee: YEON SYSTEMS CO., LTD., Seoul (KR)

( * ) Notice: Subject to any disclaimer, the term of this patent is extended or adjusted under 35 U.S.C. 154(b) by 0 days.

(21) Appl. No.: 15/555,824

(22) PCT Filed: Dec. 23, 2016

(86) PCT No.: PCT/KR2016/015239
§ 371 (c)(1),
(2) Date: Sep. 5, 2017

(87) PCT Pub. No.: WO2017/111558
PCT Pub. Date: Jun. 29, 2017

(65) Prior Publication Data
US 2018/0295343 A1 Oct. 11, 2018

(30) Foreign Application Priority Data
Dec. 24, 2015 (KR) .................. 10-2015-0186872

(51) Int. Cl.
*H04N 13/204* (2018.01)
*G02B 27/14* (2006.01)
(Continued)

(52) U.S. Cl.
CPC .............. *H04N 13/204* (2018.05); *G02B 7/02* (2013.01); *G02B 7/04* (2013.01); *G02B 7/10* (2013.01);
(Continued)

(58) Field of Classification Search
CPC ................................ G02B 7/10; H04N 13/204
See application file for complete search history.

(56) References Cited

U.S. PATENT DOCUMENTS 1,461,367 A 7/1923 Ott
2,630,737 A 3/1953 Ramsdell
(Continued)

FOREIGN PATENT DOCUMENTS

CN 101636432 A 9/2010
CN 102902150 A 1/2013
(Continued)

OTHER PUBLICATIONS

International Search Report and Written Opinion for International Application No. PCT/KR2016/015239 (dated Apr. 3, 2017). (8 Pages).
(Continued)

*Primary Examiner* — Girumsew Wendmagegn
(74) *Attorney, Agent, or Firm* — Lucas & Mercanti, LLP

(57) ABSTRACT

The present invention relates to a monocular stereoscopic camera for capturing a stereoscopic image of an object, and the monocular stereoscopic camera according to the present invention has: a first imaging lens assembly; a half mirror for reflecting a portion of light rays which have passed through the first imaging lens assembly while allowing the remaining light rays to pass through; a first camera including a third imaging lens assembly for imaging the light rays which have been reflected by the half mirror; a second camera including a third imaging lens assembly for imaging the light rays which have passed through the half mirror; and a second imaging lens assembly arranged on an optical axis between the first imaging lens assembly and the half mirror or on an optical axis between the half mirror and the third imaging lens assembly.

9 Claims, 12 Drawing Sheets

(51) Int. Cl.
*G03B 35/08* (2006.01)
*G02B 27/10* (2006.01)
*G02B 7/02* (2006.01)
*G02B 7/04* (2006.01)
*G03B 35/10* (2006.01)
*G02B 7/10* (2006.01)
*G02B 13/00* (2006.01)

(52) U.S. Cl.
CPC ....... *G02B 13/0095* (2013.01); *G02B 27/106* (2013.01); *G02B 27/1066* (2013.01); *G02B 27/144* (2013.01); *G03B 35/08* (2013.01); *G03B 35/10* (2013.01)

(56) References Cited

U.S. PATENT DOCUMENTS

| | | | |
|---|---|---|---|
| 2,916,962 | A | 12/1959 | Lawrence |
| 5,264,928 | A | 11/1993 | Howes |
| 5,337,178 | A | 8/1994 | Kung |
| 5,355,253 | A | 10/1994 | Nanjo et al. |
| 5,646,411 | A | 7/1997 | Kain et al. |
| 6,320,696 | B1 | 11/2001 | Greenberg et al. |
| 7,970,276 | B1 * | 6/2011 | Routhier ............... F16M 11/32 396/325 |
| 2004/0091259 | A1 | 5/2004 | Hanzawa |
| 2004/0109231 | A1 | 6/2004 | Haisch et al. |
| 2005/0099682 | A1 | 5/2005 | Lauer |
| 2010/0110204 | A1 | 5/2010 | Campbell et al. |
| 2010/0245546 | A1 | 9/2010 | Kuroki |
| 2011/0200319 | A1 | 8/2011 | Kravitz |
| 2012/0163791 | A1 | 6/2012 | Juri et al. |
| 2013/0027522 | A1 * | 1/2013 | Yamada ............... H04N 13/239 348/47 |
| 2014/0267632 | A1 | 9/2014 | Ward |
| 2015/0268481 | A1 | 9/2015 | Strohmeier et al. |
| 2017/0045727 | A1 | 2/2017 | Yang |
| 2018/0045945 | A1 | 2/2018 | Pyo |
| 2018/0180984 | A1 | 6/2018 | Pyo |

FOREIGN PATENT DOCUMENTS

| | | |
|---|---|---|
| CN | 106471427 A | 3/2017 |
| DE | 102013215734 A1 | 2/2015 |
| EP | 2200271 A1 | 6/2010 |
| EP | 2384693 A1 | 11/2011 |
| EP | 2736108 A1 | 5/2014 |
| GB | 2379280 A | 3/2003 |
| JP | H05154111 A | 6/1993 |
| JP | 2002505011 A | 2/2002 |
| JP | 2004109554 A | 4/2004 |
| JP | 2004163413 A | 6/2004 |
| JP | 2012150448 A | 8/2012 |
| JP | 2013025928 A | 2/2013 |
| JP | 2015184677 A | 10/2015 |
| KR | 100986286 B1 | 10/2010 |
| KR | 101214855 B1 | 12/2012 |
| KR | 20130012436 A | 2/2013 |
| KR | 101234346 B1 | 3/2013 |
| KR | 101244866 B1 | 3/2013 |
| KR | 101255803 B1 | 4/2013 |
| KR | 101476820 B1 | 12/2014 |
| WO | 03021327 A2 | 3/2003 |
| WO | 2014185578 A1 | 11/2014 |

OTHER PUBLICATIONS

International Search Report for International Application No. PCT/KR2016/011506 filed Jan. 20, 2017. (8 Pages).
Hecht, "Optics Second Edition", 1987, 3 pages.
Extended European Search Report for European application No. 16879425.3 filed Dec. 23, 2016. (8 Pages).

* cited by examiner

[Fig 1]
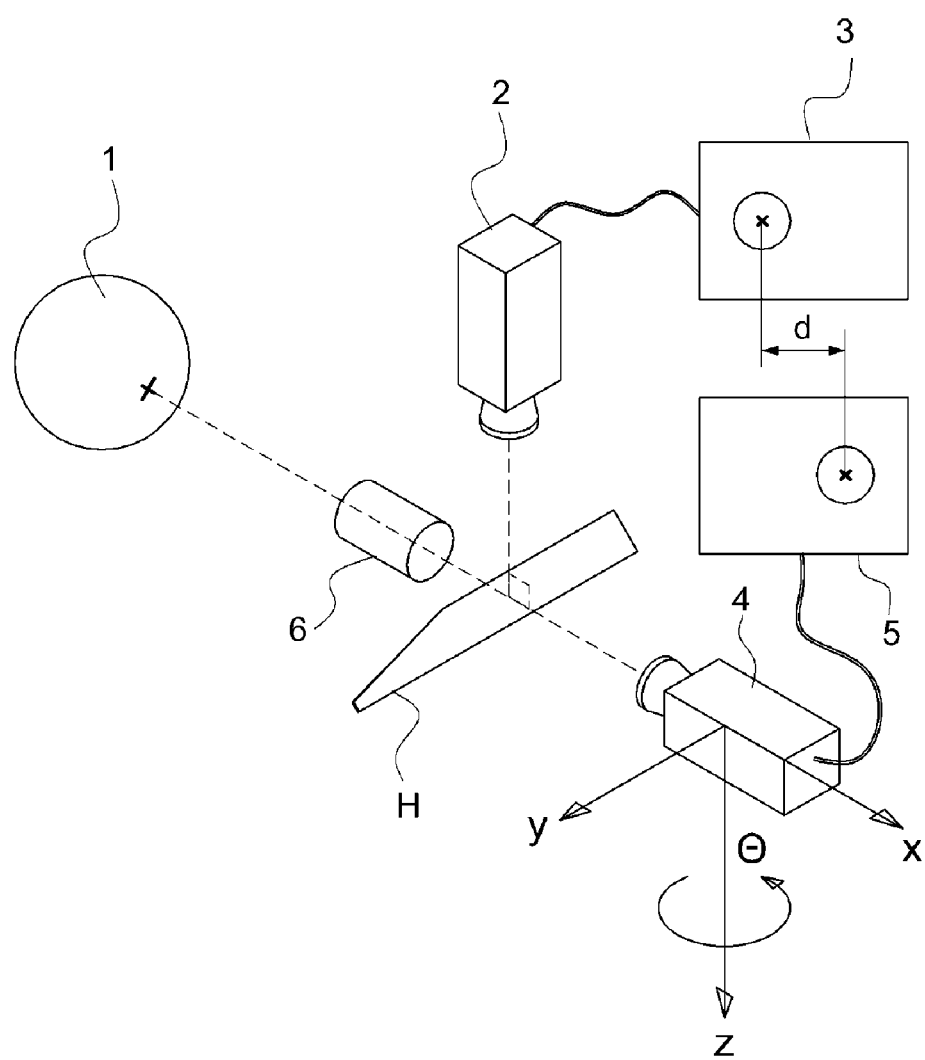

[Fig 2]
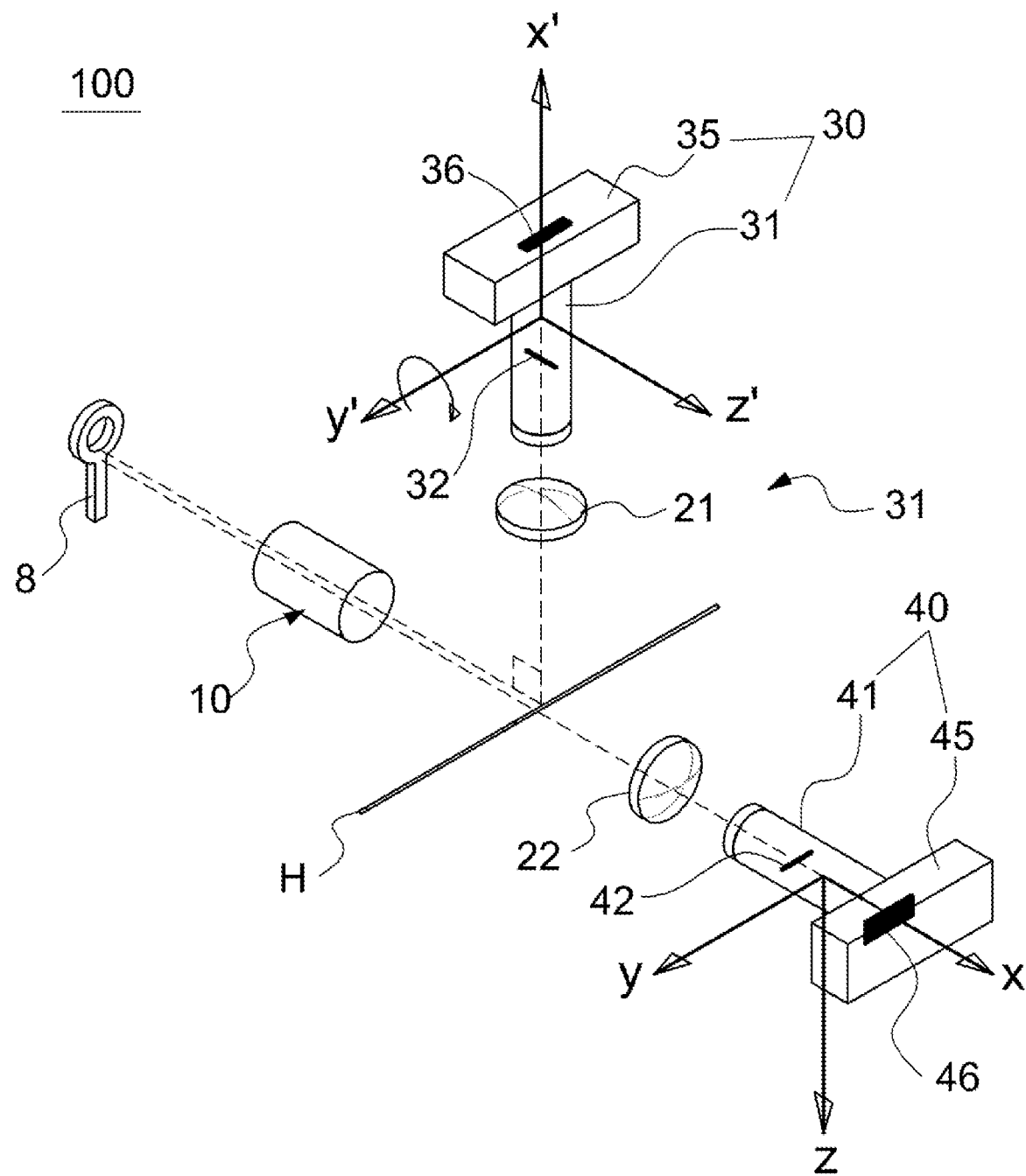

[Fig 3]
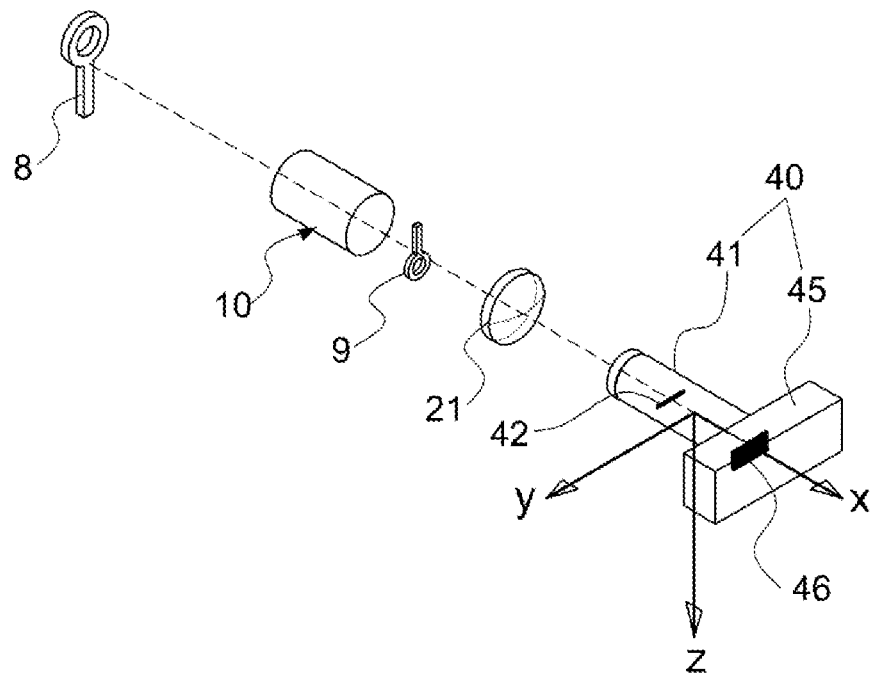

【Fig 4】
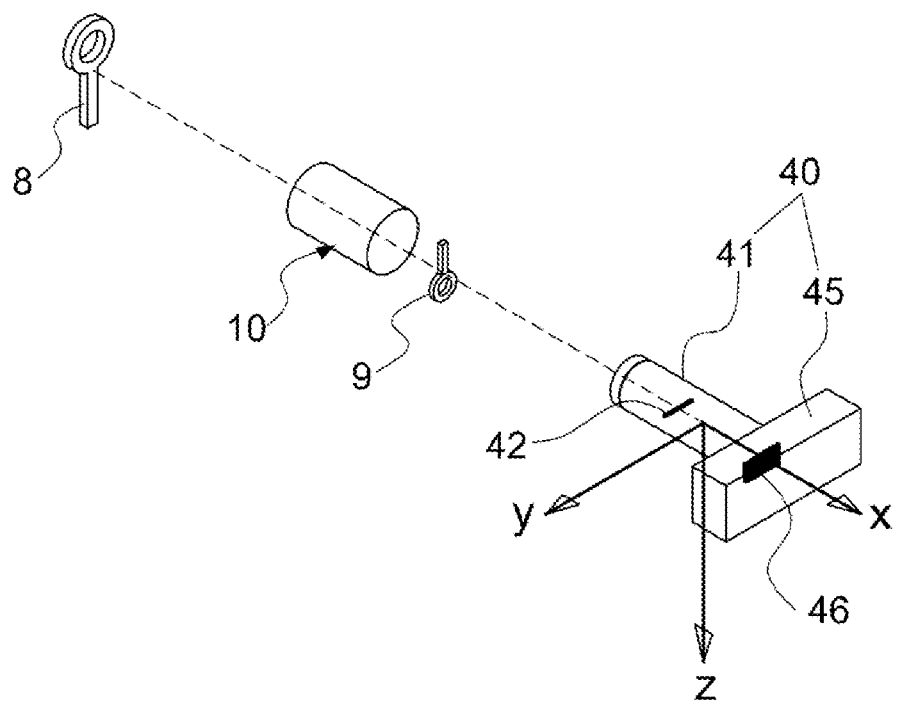

[Fig 5]
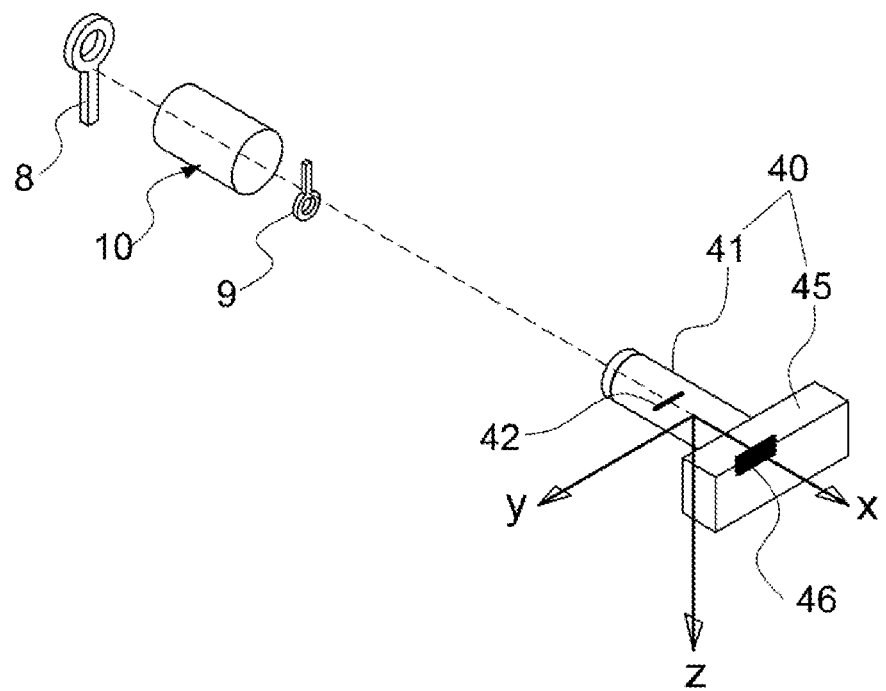

[Fig 6]
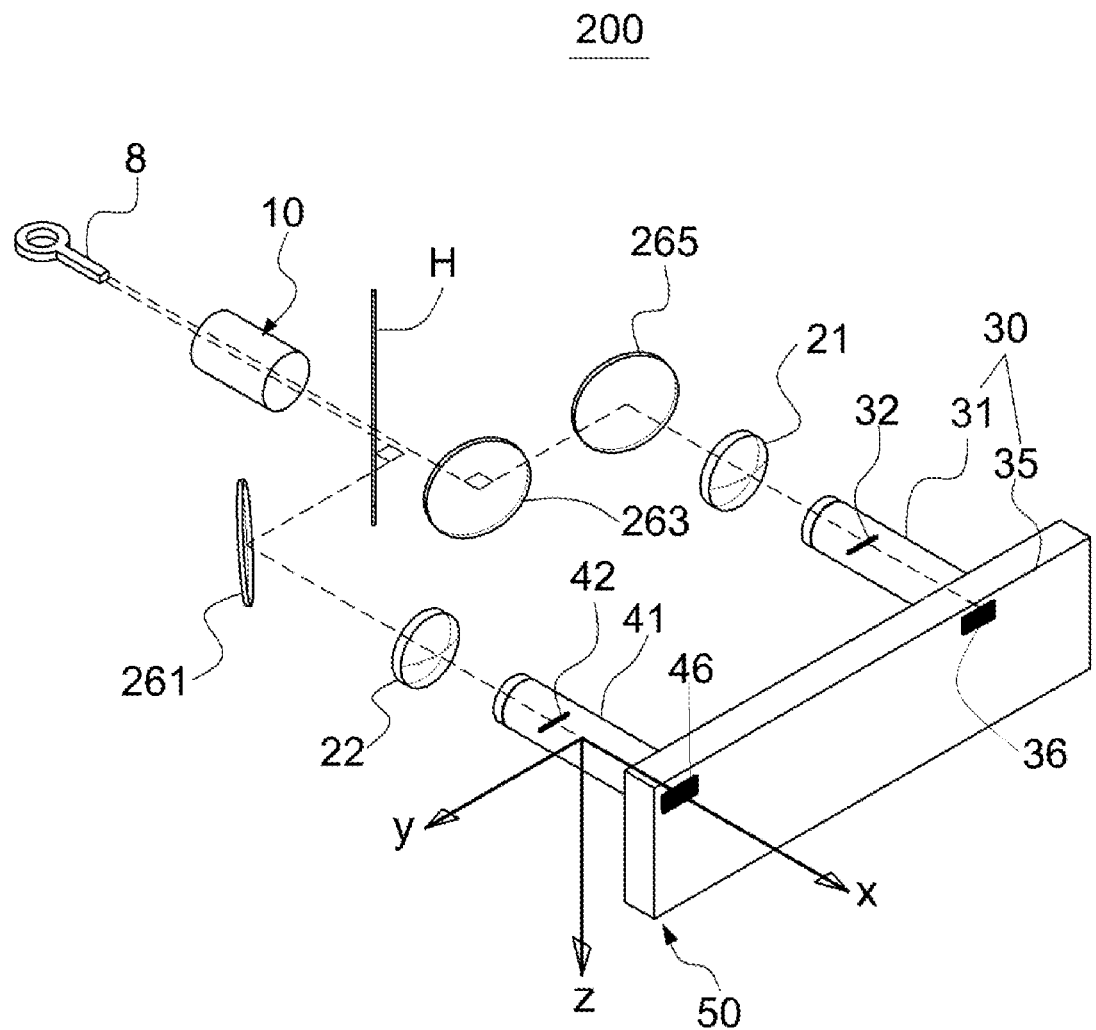

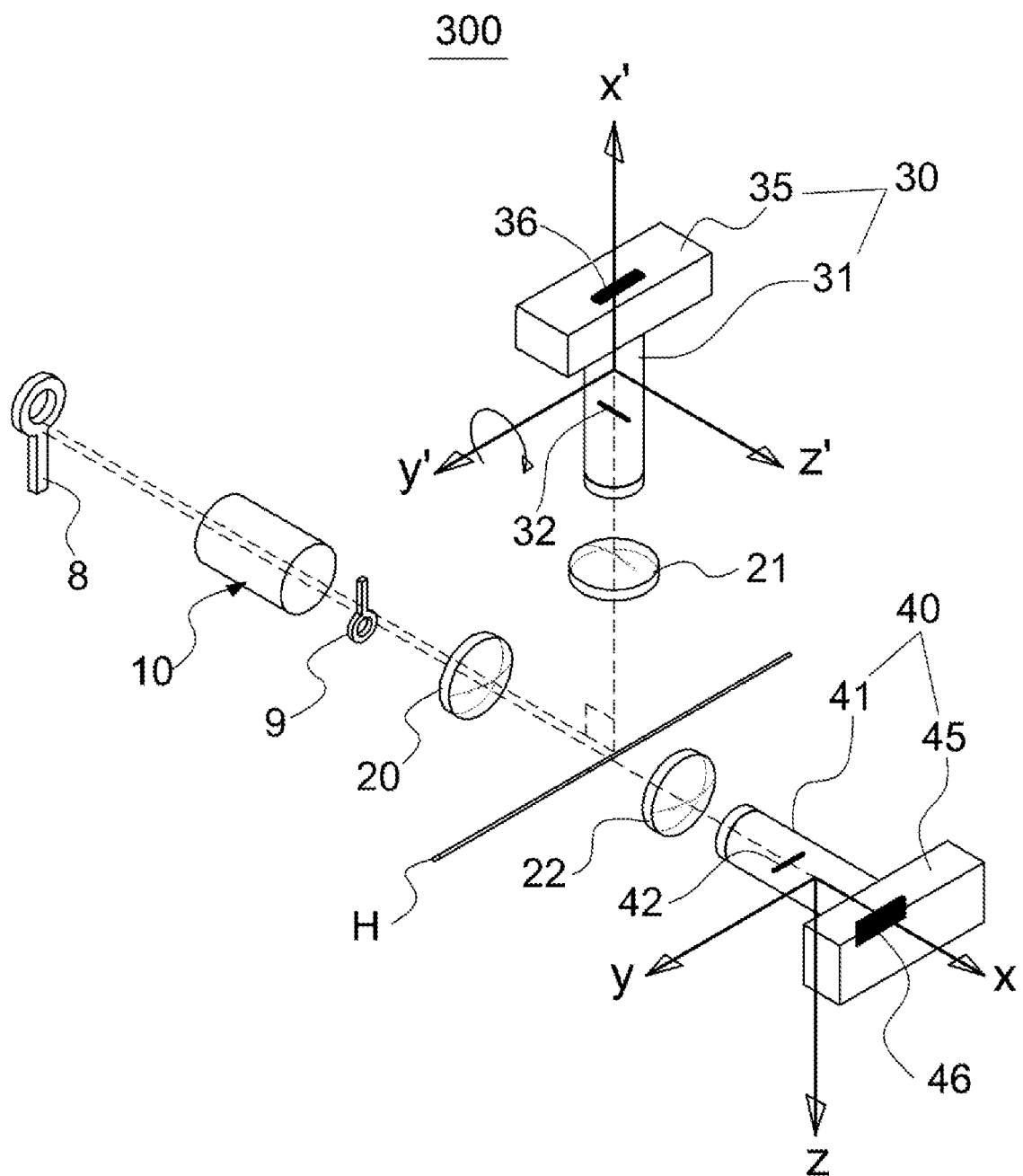
[Fig 7]

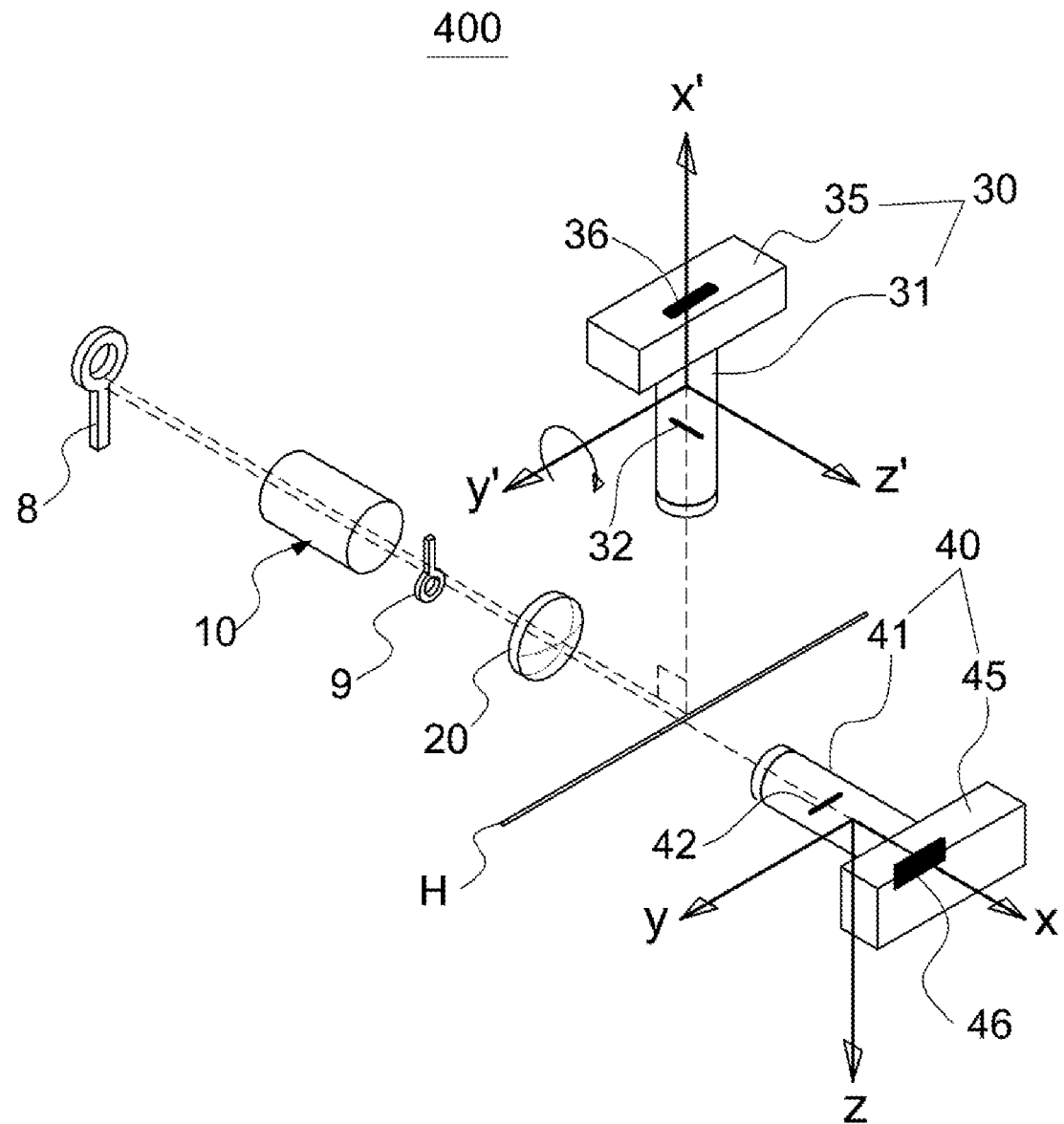
[Fig 8]

【Fig 9】
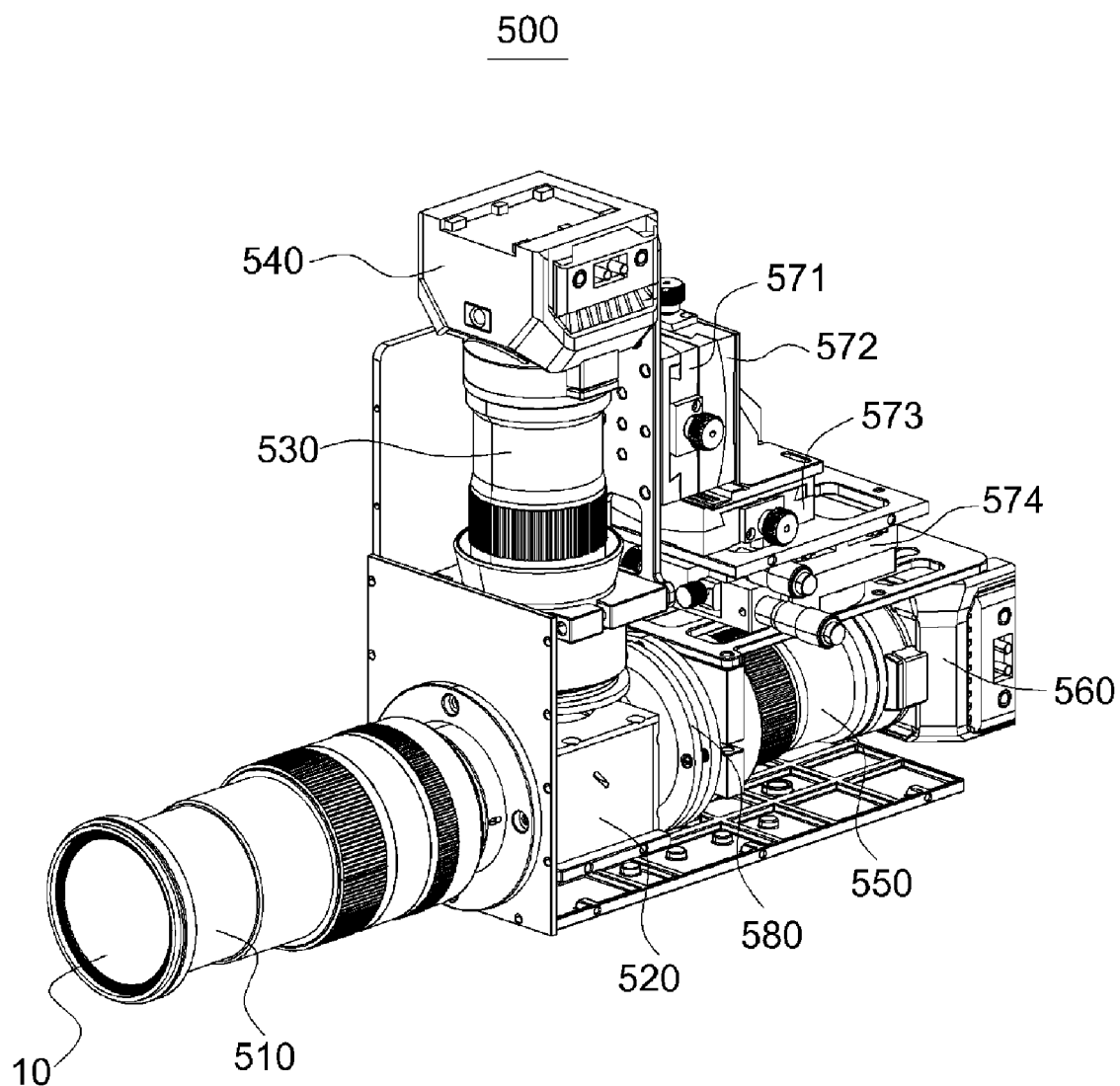

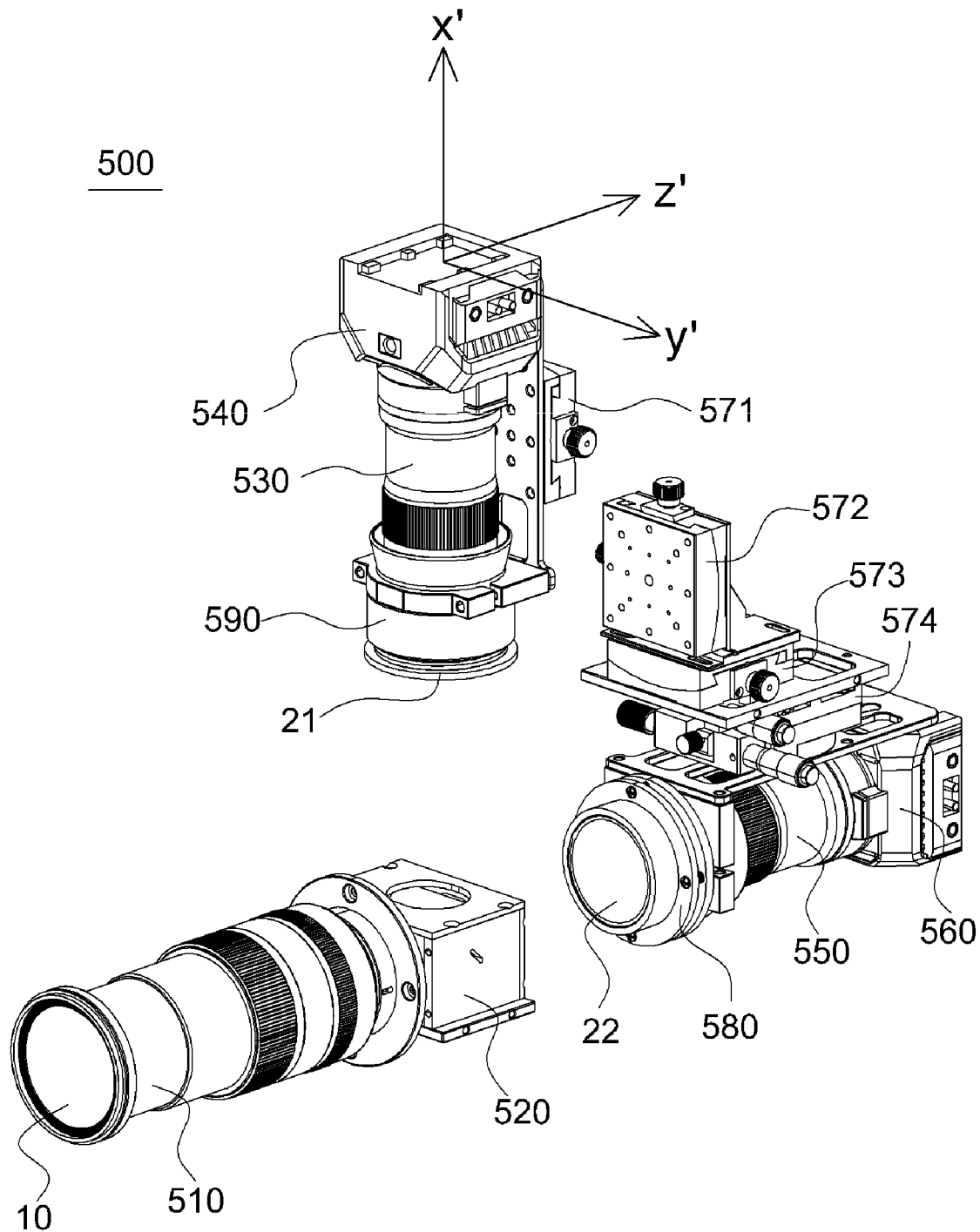
[Fig 10]

【Fig 11】
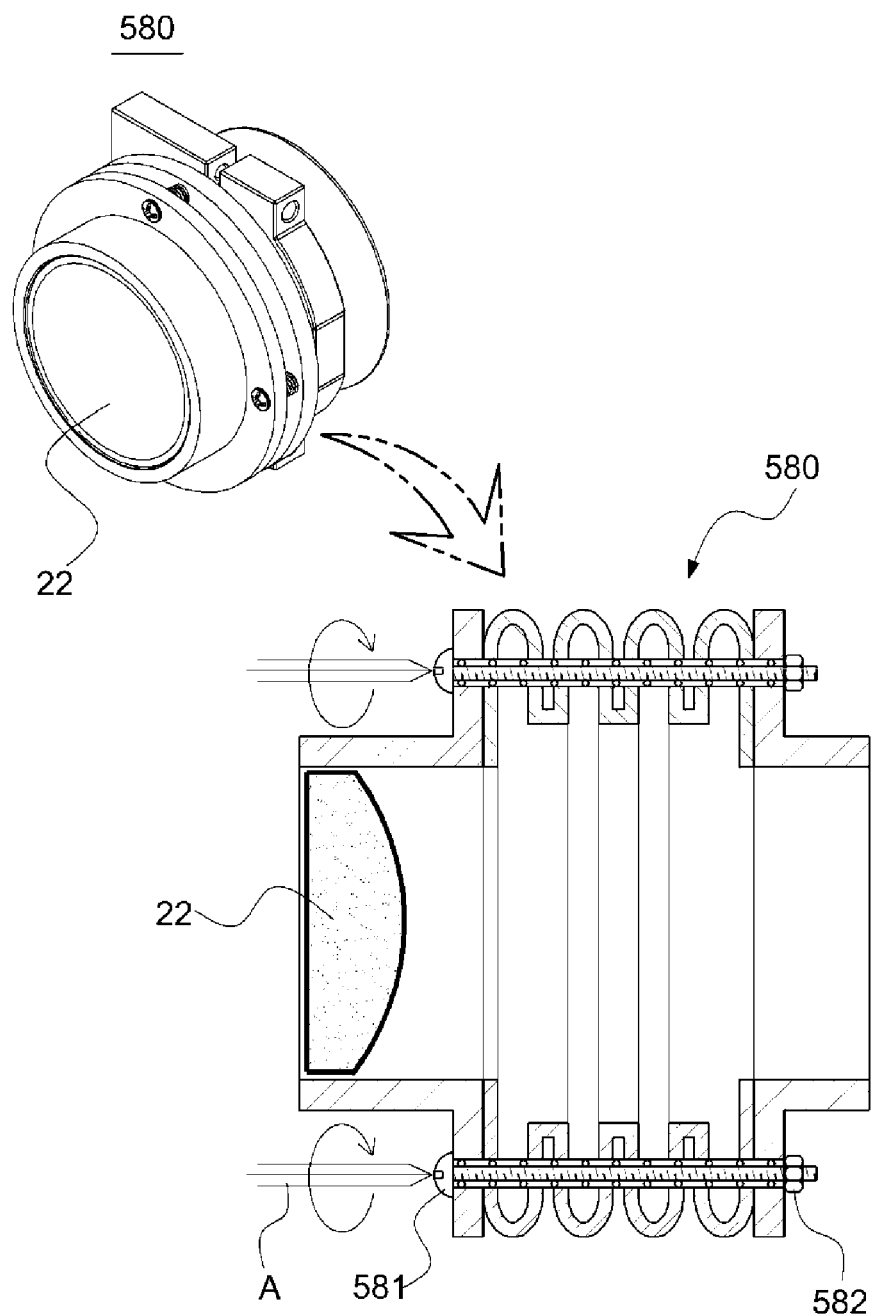

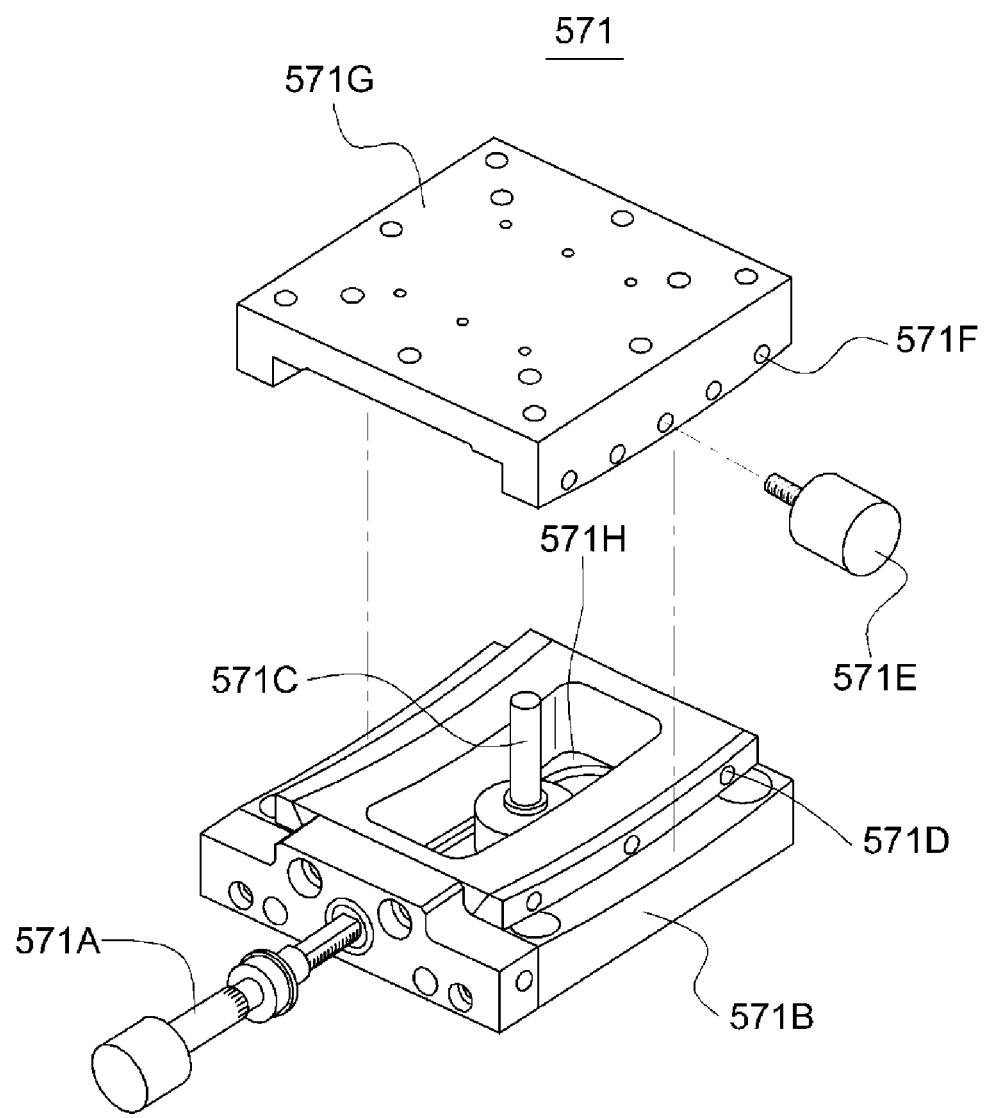
[Fig 12]

MONOCULAR STEREOSCOPIC CAMERA

CROSS-REFERENCE TO RELATED APPLICATIONS

This application is a 371 of PCT/KR2016/015239, filed on Dec. 23, 2016, which claims the benefit of Korean Patent Application No. 10-2015-0186872 filed Dec. 24, 2015 the contents of each of which are incorporated herein by reference.

TECHNICAL FIELD

The present invention relates to a monocular stereoscopic camera for capturing a stereoscopic image of a subject, and more particularly, to a monocular stereoscopic camera which may identically control an image rapidly and precisely captured by a camera at a photographing site, may change an optical axis, may adjust a convergence angle, and may correct a position error of the camera.

BACKGROUND ART

A stereoscopic camera is a camera capable of simultaneously acquiring a left-eye image and a right-eye image of a subject using two cameras, and the general stereoscopic camera includes a left-eye camera configured to acquire a left-eye image of a subject and a right-eye camera configured to acquire a right-eye camera of the subject.

FIG. 1 is a schematic view illustrating a stereoscopic camera according to the related art. Referring to FIG. 1, a light beam of a subject 1 passes through a main lens 6. The light beam passing through a half mirror H is imaged on a left-eye camera 4 so that a left-eye image 5 is acquired, and the light beam reflected by the half mirror H is imaged on a right-eye camera 2 so that a right-eye camera 3 is acquired. The images 3 and 5 acquired by the left-eye camera 4 and the right-eye camera 2 have binocular disparity, so that a stereoscopic image may be implemented.

To allow a stereoscopic camera to acquire a stereoscopic image, the right-eye image 3 and the left-eye image 5 should have binocular disparity, and the sizes of the images should be equal to each other. When the sizes of the right-eye image 3 and the left-eye image 5 themselves are not equal to each other, a stereoscopic image having remarkably low quality is obtained.

Thus, to make the sizes of the left-eye image and the right-eye image be equal to each other, the stereoscopic camera according to the related art performs a control such that the sizes of the images are made to be equal to each other by forwards/rearwards moving the left-eye camera 4 along an optical axis (on an X axis), or performs a control such that the sizes of the images are made to be equal to each other by forwards/rearwards moving the right-eye camera 2 along an optical axis. However, a movement of a subject changes from moment to moment. It is practically difficult to capture a stereoscopic image while the left-eye camera and the right-eye camera finely moves forwards/rearwards, and it is very inconvenient to perform a control to change mechanical positions of the cameras.

Further, to acquire a stereoscopic image, the stereoscopic camera should change optical axes of the left-eye camera and the right-eye camera or adjust a convergence angle. In the related art, in case of the left-eye camera 4, an optical axis is changed or the convergence angle is adjusted, by rotating the left-eye camera about a Z axis. The convergence angle is related to a position of a convergence point that is a point at which left and right images of two cameras coincide with each other on a screen when a subject is photographed in a state in which the two cameras or two lenses are spaced apart from each other in a left-right direction by a predetermined distance. By adjusting the convergence point, a stereoscopic image of the subject is viewed to protrude toward the front side of the screen or retract backwards.

To allow the stereoscopic camera to acquire the stereoscopic image, optical axis alignment is necessarily required. The optical axis alignment refers to allowing a position of a half mirror or a camera to coincide with an optical axis by correcting the position of the half mirror or the camera. When optical axes are not aligned with each other, a stereoscopic image having high quality cannot be acquired. Thus, in the related art, to change the optical axes of the left-eye camera and the right-eye camera, in case of the left-eye camera 4, a photographer changes an optical axis by rotating the left-eye camera 4 about a Y axis or changes the optical axis by rotating the left-eye camera 4 about a Z axis.

That is, to acquire a stereoscopic image, the stereoscopic camera according to the related art employs a scheme in which a photographer directly moves a physical position of a camera or rotates the camera.

In Korean Patent No. 1214855 as an example of the related art, adjustment modules are mounted on both a left-eye camera and a right-eye camera, and optical axis alignment and a convergence angle are adjusted using the adjustment modules. However, as described above, Korean Patent No. 1214855 has a problem in that because a structure of the adjustment modules is very complex, applicability to a photographing site in which a subject moving from moment to moment is photographed deteriorates, and costs consumed for commercialization is high.

Further, when a left-eye image and a right-eye image are captured, distances from left and right lenses to a subject should coincide with each other, and physical characteristics of the two lenses should coincide with each other as well. Because there is an error when a lens is manufactured, it is difficult to manufacture lenses having the same physical characteristics. It is very difficult to capture a precise stereoscopic image using two lenses having different physical characteristics. This is because when the two lenses having limitation of physical identity, only if the sizes of the left-eye image and the right-eye image coincide with each other, a stereoscopic image having high quality can be acquired. Thus, a novel monocular stereoscopic camera, which may perform a control to rapidly, easily, and precisely change the sizes of the images, the convergence angle, and the optical axis at a photographing site, is acutely required.

DISCLOSURE

Technical Problem

The present invention is conceived to solve the above-described problems, and an aspect of the present invention is to provide a monocular stereoscopic camera by which a photographer may simply and easily (1) perform a control to make images captured by first and second cameras of the camera be identical to each other, (2) change an optical axis, (3) adjust a convergence angle, and (4) correct position errors of a third imaging lens assembly, a half mirror, and the camera, even without a manipulation of a position of a camera body and a rotation of the camera body.

Technical Solution

To solve the above-described problems, a monocular stereoscopic camera according to the present invention includes a first imaging lens assembly 10, a half mirror H configured to reflect a portion of a light beam passing through the first imaging lens assembly 10 and allow the other portion of the light beam to pass therethrough, a first camera 30 including a third imaging lens assembly 31 configured to image the light beam having been reflected by the half mirror H, a second camera 40 including a third imaging lens assembly 41 configured to image the light beam having passed through the half mirror H, and second imaging lens assemblies 20, 21, and 22 arranged on an optical axis between the first imaging lens assembly 10 and the half mirror H or an optical axis between the half mirror H and the third imaging lens assemblies 31 and 41.

That is, the monocular camera according to the present invention includes the second imaging lens assemblies 20, 21, and 22, and the second imaging lens assemblies 20, 21, and 22 move along an optical axis, to change focal positions of the third imaging lens assemblies 31 and 41 or to make the size of an image of the first camera 30 and the size of an image of the second camera 40 be equal to each other.

In the monocular stereoscopic camera according to the present invention, as the second imaging lens assemblies 20, 21 and 22 are rotated (hereinafter, referred to as "tilted") about extension lines (Y axis and Y' axis) extending in a left vertical direction with respect to the optical axes, optical axis alignment is performed. As the second imaging lens assemblies 20, 21 and 22 are rotated (hereinafter, referred to as "panned") about extension lines (Z axis and Z' axis) extending in a lower vertical direction with respect to the optical axes, optical axis alignment and convergence angle adjustment are performed.

Advantageous Effects

A monocular stereoscopic camera according to the present invention may simply and easily (1) perform a control to make images captured by first and second cameras of the camera be identical to each other, (2) change an optical axis, (3) adjust a convergence angle, and (4) correct position errors of a third imaging lens assembly, a half mirror, and the camera, even without a manipulation of a position of the camera itself and a rotation of the camera itself.

Thus, a subject moving from moment to moment at a photographing site is easily and rapidly controlled in accordance with a situation, a stereoscopic image having high quality, on which a 3-dimensional effect is represented well, can be acquired.

BRIEF DESCRIPTION OF THE DRAWINGS

FIG. 1 is a schematic view for explaining a monocular stereoscopic camera according to the related art;

FIG. 2 is a schematic illustrating a monocular stereoscopic camera according to a first embodiment of the present invention;

FIGS. 3 to 5 are schematic views illustrating a single camera obtained by removing a half mirror H of FIG. 2.

FIG. 6 is a schematic view illustrating a monocular stereoscopic camera according to a second embodiment of the present invention;

FIG. 7 is a schematic view illustrating a stereoscopic camera according to a third embodiment of the present invention;

FIG. 8 is a schematic view illustrating a stereoscopic camera according to a fourth embodiment of the present invention;

FIG. 9 is a perspective view illustrating a stereoscopic camera on which optical configurations of FIG. 2 are mounted according to a fifth embodiment;

FIG. 10 is an exploded perspective view illustrating the stereoscopic camera of FIG. 9;

FIG. 11 is a view illustrating an image obtained by enlarging a second imaging lens housing of FIGS. 9 and 10 and a cross section thereof; and FIG. 12 is an exploded perspective view illustrating a Gonio stage of FIGS. 9 and 10, which is a panning, tilting, and rolling means.

BEST MODE FOR THE INVENTION

It should be noted in the present specification that when components in the drawings are designated by reference numerals, the same components have the same reference numerals as much as possible even though the components are illustrated in different drawings.

Meanwhile, the meaning of the terms described herein should be understood as follows.

It should be understood that a singular expression includes a plural expression unless it is clearly defined in the context in another way. Further, the terms "first" and "second" are used to distinguish one component from another component, and the scope of a right should not be delimited by these terms.

It should be understood that the term "including" or "having" does not exclude the presence or addition possibility of one or more other features or numbers, steps, actions, components, parts, or a combination thereof in advance.

It should be understood that the term "at least one" includes all combinations that may be presented from one or more related items. It should be understood that the term "and/or" includes all combinations that may be presented from one or more related items.

It should be understood that when it is mentioned that a first component is "connected to or arranged in" a second component, the first component is directly connected to or installed in the second component, but a third component may be interposed therebetween. On the other hand, it should be understood that when it is mentioned that a first component is "directly connected to or installed in" a second component, a third component is not interposed therebetween. Meanwhile, other expressions describing a relationship between components, such as "between", "directly between", "adjacent", "directly adjacent" should be interpreted in the same manner. A "stereoscopic image" described below includes not only a stereoscopic image of a stationary subject but also a moving image obtained by connecting dynamic stereoscopic images of a moving subject to each other, and an "imaging lens assembly" may be configured by one lens or may be configured by two or more lenses.

As described above, the present invention provides a monocular stereoscopic camera which may conveniently, easily and identically control an image using a second imaging lens assembly even without moving the camera, may change an optical axis, may adjust a convergence angle, and may correct a position error of the camera. Hereinafter, exemplary embodiments of the present invention will be described in more detail with reference to the accompanying drawings.

(1) First Embodiment

FIG. 2 is a schematic illustrating a monocular stereoscopic camera according to a first embodiment of the present invention; Referring to FIG. 2, a monocular stereoscopic camera 100 according to the present invention includes a first imaging lens assembly 10, a half mirror H, second imaging lens assemblies 21 and 22, third imaging lens assemblies 31 and 41, a first camera 30 and a second camera 40.

The first imaging lens assembly 10 collects a light beam input from a subject 8. The light beam passing through the first imaging lens 10 is moved to the half mirror H. The half mirror H reflects a portion of the light beam and penetrates the other portion of the light beam. The light beam reflected by the half mirror H passes through the second imaging lens assembly 21, and is then imaged on the third imaging lens assembly 31, and the light beam passing through the half mirror H passes through the second imaging lens assembly 22 and is then imaged on the third imaging lens assembly 41. As illustrated in FIG. 2, the third imaging lens assemblies 31 and 41 may be mounted on the first and second cameras 30 and 40, respectively. The stereoscopic camera 100 according to the present embodiment has a shape of an orthogonal rig in which optical axes connecting the half mirror H and the third imaging lens assemblies 31 and 41 are perpendicular or almost perpendicular to each other.

<Movement of Second Imaging Lens Assemblies Along Optical Axes>

The second imaging lens assemblies 21 and 22 move along optical axes (X' axis and X axis), so that a control may be performed such that (1) focal positions of the third imaging lens assemblies 31 and 41 may be changed, and (2) the size of an image formed in the third imaging lens assembly 31 and the size of an image formed in the third imaging lens assembly 41 are equal to each other.

As described above, in the related art, using a scheme in which the first camera 30 and the second camera 40 themselves on which the third imaging lens assemblies 31 and 41 are mounted move along the optical axes (X' axis and X axis), the focal positions of the third imaging lens assemblies 31 and 41 are adjusted, and the sizes of the images of the first and second cameras are made to be equal to each other. However, in the scheme in which the first and second cameras themselves move, it is very difficult to easily and rapidly control a subject moving from moment to moment in a photographing site according to a situation, and a lot of time is consumed.

In the present invention, a scheme in which the second imaging lens assemblies 21 and 22 move and rotate is conceived to solve the above-described problems. First, a structure and a function of the second imaging lens assemblies 21 and 22 will be described.

A principle in which focal positions of the third imaging lens assemblies and the sizes of the images are changed depending on changes in positions of the second imaging lens assemblies will be described in detail with reference to FIGS. 3 to 5. To help understanding, FIGS. 3 to 5 are schematic views illustrating a single camera obtained by removing a half mirror H of FIG. 2.

FIG. 3 illustrates a state in which the second imaging lens assembly 21 is installed, and FIG. 4 illustrates a state in which the second imaging lens assembly 21 is not installed. The second imaging lens assembly 21 serves to forwards move the focal position of the third imaging lens assembly 41, that is, to move the focal position of the third imaging lens assembly 41 to the right side of FIG. 3, so that the entire length of the system (a length from the first imaging lens assembly 10 to an imaging surface 46) may be reduced (the position of the first imaging lens assembly may move to the right side of the drawing).

In other words, because the focal position of the third imaging lens assembly 41 should be a position of a virtual image 9 of the first imaging lens assembly 10, the focal position of the third imaging lens assembly 41 may forwards move using the second imaging lens assembly 21.

For example, when a normal stereoscopic image is acquired by an optical configuration of FIG. 3, because the focal position of the third imaging lens assembly 41 and the position of the virtual image 9 of the first imaging lens assembly 10 do not coincide with each other in FIG. 4, a normal image cannot be formed. In this case, as illustrated in FIG. 5, the normal image may be obtained only when the first imaging lens assembly 10 moves such that the first imaging lens assembly 10 is located to be farther away from the third imaging lens assembly 41. However, when the first imaging lens assembly 10 moves as illustrated in FIG. 5, a vignetting phenomenon occurs.

In this way, the second imaging lens assembly 21 serves to control the focal position of the third imaging lens assembly 41 and the size of the image. Further, when the second imaging lens assembly moves along the optical axis, the focal position of the third imaging lens assembly 41 and the size of the image may be controlled even without moving the third imaging lens assembly 41 and the camera themselves.

Referring to FIG. 2, an operation, in which the focal positions are adjusted while the first camera 30 and the second camera 4 move along the optical axes according to a position of a subject and the size of an image of the first camera 30 and the size of an image of the second camera 40 coincide with each other, is necessarily required during photographing. The present invention may perform a control to adjust a focal position and make the size of the image of the first camera 30 and the size of the image of the second camera 40 be equal to each other, by moving the second imaging lens assembly 21 along the optical axis between the half mirror H and the third imaging lens assembly 31 or moving the second imaging lens assembly 22 along the optical axis between the half mirror H and the third imaging lens assembly 41, without moving the first and second cameras 30 and 40.

<Panning of Second Imaging Lens Assemblies>

As illustrated in FIG. 2, the optical axes may be moved and the convergence angle may be adjusted, by panning in which the second imaging lens assembly 22 is rotated about a Z axis and the second imaging lens assembly 21 is rotated about a Z' axis. The convergence angle is related to a position of a convergence point that is a point at which left and right images of two cameras coincide with each other on a screen when a subject is photographed in a state in which the two cameras or two lenses are spaced apart from each other in a left-right direction by a predetermined distance. By placing the convergence point at a close position or at a far position, a stereoscopic image of the subject is viewed to protrude toward the front side of the screen or retract backwards.

In the monocular stereoscopic camera 100 according to the present invention, the optical axes may be moved and the convergence angle may be adjusted by easily and conveniently panning the second imaging lens assemblies 21 and 22 without panning the first and second cameras 30 and 40 themselves.

<Tilting of Second Imaging Lens Assemblies>

As illustrated in FIG. 2, the optical axes may be moved by tilting in which the second imaging lens assembly 22 is rotated about a Y axis and the second imaging lens assembly 21 is rotated about a Y' axis. The movement of the optical axes by the tilting of the second imaging lens assemblies 21 and 22 should be necessarily controlled by a photographer during photographing to compensate for positions of the half mirror H, the first camera 30, the second camera 40, and the third imaging lens assemblies 31 and 41. In detail, in the related art, to compensate for an error of an installation angle of the half mirror H, the optical axes are aligned with each other by minutely moving the first and second cameras 30 and 40. In the same sense, the third imaging lens assemblies 31 and 41 and the first and second cameras 30 and 40 may not be arranged to be physically perfectly perpendicular to each other, and the first and second cameras 30 and 40 should be moved in accordance with the light beams passing through and reflected by the half mirror H.

In the monocular stereoscopic camera according to the present invention, the optical axes may be moved and errors of positions of the half mirror H, the third imaging lens assemblies 31 and 41, and the first and second cameras 30 and 40 may be compensated for, by tilting the second imaging lens assemblies 21 and 22 even without tilting the half mirror H, the second imaging lens assemblies 31 and 41, and the first and second cameras 30 and 40 themselves.

Schemes and functions of the panning and the tilting of the second imaging lens assemblies 21 and 22 will be summarized in Table 1.

TABLE 1

| Classification | Rotation of second imaging lens assembly (see FIG. 2) | Function |
| --- | --- | --- |
| Panning | Rotation about Z axis or Z' axis | Movement of optical axis, and adjustment of convergence angle |
| Tilting | Rotation about Y axis or Y' axis | Movement of optical axis, and correction of position errors of half mirror, third imaging lens assembly, and first and second cameras |

The second imaging lens assemblies 21 and 22 or the third imaging lens assemblies 31 and 41 may be selected from one or more of a macro lens capable of close-up photographing and a telephoto lens.

When there is a limitation in adjusting a distance between an imaging surface 36 and the third imaging lens assembly 31 and a distance between the imaging surface 46 and the third imaging lens assembly 41, the telephoto lens is used as the third imaging lens assemblies 31 and 41, and the second imaging lens assemblies 21 and 22 are used together, so that the close-up photographing may be performed, and thus an image of the first imaging lens assembly 10 may be magnifiedly captured. Otherwise, the macro lens (a lens capable of close-up photographing) is used as the third imaging lens assemblies 31 and 41, and the second imaging lens assemblies 21 and 22 are additionally used, so that the focal position is made closer. In addition, the second imaging lens assemblies 21 and 22 have a function of correcting chromatic aberration and a curvature of an upper surface, so that a virtual image formed on the rear side of the first imaging lens assembly 10 may be finally and magnifiedly captured. Further, a scheme obtained by crossing or mixing the above-described schemes may be also used.

In particular, when the sizes of the imaging surfaces 36 and 46 are larger than the size of an image of a first virtual focal surface formed by the first imaging lens assembly 10, the macro lens capable of the close-up photographing is used as the third imaging lens assemblies 31 and 41 or a lens, a magnification of which may be adjusted, is installed in the second imaging lens assembly 20, so that a vignetting phenomenon may be reduced, and a selection width of the first imaging lens assembly 10 may be widened.

Further, the macro lens capable of the close-up photographing is used as the third imaging lens assemblies 31 and 41, so that the entire size of the system from the first imaging lens assembly 10 to the image surfaces 36 and 46 may be reduced as compared to a case where the telephoto lens is used.

Meanwhile, to obtain the above effect, a lens having a higher magnification (a (lens having a short focal distance) may be also used as the second imaging lens assemblies 21 and 22.

The second imaging lens assemblies 21 and 22 or the third imaging lens assemblies 31 and 41 may be selected from one or more of an achromatic lens and an apochromatic lens, or may also employ a physical combination of the achromatic lens and the apochromatic lens. The achromatic lens, which is obtained by allowing two lenses having different refractive indexes to overlay each other, may reduce chromatic aberration. The apochromatic lens, which is obtained by allowing three or more lenses having different refractive indexes to overlap each other, may further reduce chromatic aberration. Here, the apochromatic lens includes a superapochromatic lens and a hyperapochromatic lens, which are manufactured by allowing four or more lenses to overlap each other.

Additionally, in the stereoscopic camera 100 according to the present invention, the lens, the magnification of which may be adjusted, is installed in the second imaging lens assembly 20, so that a view angle may be adjusted and a vignetting phenomenon may be minimized.

Meanwhile, in the stereoscopic camera 100 according to the present invention, apertures 32 and 42 may be installed in the third imaging lens assemblies 31 and 41, and may not be installed in the first imaging lens assembly 10. Further, even though a lens in which an aperture is installed is used as the first imaging lens assembly 10, photographing is performed in a state in which the aperture installed in the first imaging lens assembly 10 is opened.

(2) Second Embodiment

FIG. 6 is a schematic view illustrating a monocular stereoscopic camera according to a second embodiment of the present invention; Hereinafter, in the stereoscopic camera 200 according to a second embodiment of the present invention, because the same configuration as that of the stereoscopic camera 100 according to the first embodiment uses the same name, all other configurations except for an arrangement relationship should be interpreted in the same sense.

Referring to FIG. 6, the stereoscopic camera 200 according to the second embodiment is a horizontal rig in which optical axes connecting the half mirror H and the third imaging lens assemblies 31 and 41 are parallel or almost parallel to each other. In detail, the optical axis connecting the second imaging lens assembly 21 and the third imaging lens assembly 31 and the optical axis connecting the second imaging lens assembly 22 and the third imaging lens assembly 41 are arranged to be parallel or almost parallel to each other.

The stereoscopic camera 200 may further include reflection parts 261, 263 and 265 such that an optical axis of the light beam passing through the half mirror H and an optical axis of the light beam reflected by the half mirror H are parallel to each other. For example, the reflection parts 263 and 265 reflect the light beam passing through the half mirror H toward the second imaging lens assembly 21 and the third imaging lens assembly 32. Meanwhile, the reflection part 261 reflects the light beam reflected by the half mirror H toward the second imaging lens assembly 22 and the third imaging lens assembly 41. Here, the reflection parts 261, 263 and 265 are not particularly limited as long as they may reflect the light beams and change the optical axes, and include, for example, mirrors.

The panning and the tilting of the second imaging lens assemblies 21 and 22 are as described in the first embodiment. The stereoscopic camera 200 according to the second embodiment may conveniently and easily perform a control such that the sizes of the images captured by the first and second cameras are made to be equal to each other, may change the optical axes, may adjust the convergence angle, and may correct position errors of the third imaging lens assemblies, the half mirror, and the cameras, by movement of the second imaging lens assemblies 21 and 22 along the optical axes and the panning and the tilting of the second imaging lens assemblies 21 and 22.

In particular, when the third imaging lens assemblies 31 and 41 are mounted on one camera body 50, the third imaging lens assemblies 31 and 41 cannot be moved physically differently. However, such a problem may be solved through the movement, the tilting and the panning of the second imaging lens assemblies 21 and 22.

(3) Third Embodiment

FIG. 7 is a schematic view illustrating a stereoscopic camera according to a third embodiment of the present invention; In the stereoscopic camera 300 according to a third embodiment of the present invention, because the same configuration as that of the stereoscopic camera 100 according to the first embodiment uses the same name, all other configurations except for an arrangement relationship should be interpreted in the same sense.

Referring to FIG. 7, in the stereoscopic camera 300, the second imaging lens assembly 20 is arranged between the first imaging lens assembly 10 and the half mirror H, and the second imaging lens assemblies 21 and 22 are arranged between the half mirror H and the third imaging lens assemblies 31 and 41.

The second imaging lens assemblies 20, 21, and 22 are moved, panned, and tilted along the optical axes in the same scheme as that described in the stereoscopic camera 100 according to the first embodiment.

The second imaging lens assembly moves along an X axis to change the focal positions of the third imaging lens assemblies 31 and 41 so as to change the focal positions of the images of the first camera 30 and the second camera 40.

The second imaging lens assembly 22 moves along the X axis to change the focal position of the third imaging lens assembly 41 or to make the sizes of the images of the first camera 30 and the second camera 40 be equal to each other. The second imaging lens assembly 21 moves along the X' axis to change the focal position of the third imaging lens assembly 31 or to make the sizes of the images of the camera 30 and the second camera 40 be equal to each other.

The second imaging lens assembly 22 is rotated about the Z axis to be panned and is rotated about the Y axis to be tilted. Meanwhile, the second imaging lens assembly 21 is rotated about the Z' axis to be panned and is rotated about Y' axis to be tilted.

In the stereoscopic camera 300 according to the third embodiment, the second imaging lens assembly 20 is arranged between the first imaging lens assembly 10 and the half mirror H, so that the focal positions may be collectively changed before the light beam passes through the half mirror H, or the optical axes may be changed by the panning and the tilting. Further, the lens, the magnification of which may be adjusted, is installed in the second imaging lens assembly 20, so that a vignetting phenomenon of left and right images may be reduced.

(4) Fourth Embodiment

FIG. 8 is a schematic view illustrating a stereoscopic camera according to a fourth embodiment of the present invention; In the stereoscopic camera 400 according to a fourth embodiment of the present invention, because the same configuration as that of the stereoscopic camera 100 according to the first embodiment uses the same name, all other configurations except for an arrangement relationship should be interpreted in the same sense.

Referring to FIG. 8, in a stereoscopic camera 400, the second imaging lens assembly 20 is arranged between the first imaging lens assembly 10 and the half mirror H.

In the same scheme as that described in the stereoscopic camera 100 according to the first embodiment, the second imaging lens assembly 20 moves along the X axis, so that the focal positions of the third imaging lens assemblies 31 and 41 may be changed or the lens, the magnification of which may be adjusted, is installed in the second imaging lens assembly 20. Accordingly, vignetting phenomena of the images of the first camera 30 and the second camera 40 may be minimized. In the stereoscopic camera 400 according to the fourth embodiment, the second imaging lens assembly 20 is arranged between the first imaging lens assembly 10 and the half mirror H, so that the focal positions may be collectively changed before the light beam passes through the half mirror H, or the optical axes may be changed by the panning and the tilting.

(5) Fifth Embodiment

FIG. 9 is a perspective view illustrating a stereoscopic camera according to a fifth embodiment on which optical configurations of FIG. 2 are mounted, and FIG. 10 is an exploded perspective view illustrating the stereoscopic camera of FIG. 9. In the stereoscopic camera 500 according to a fifth embodiment of the present invention, because the same optical configuration as that of the stereoscopic camera 100 according to the first embodiment is mounted and uses the same name, all other configurations except for an arrangement relationship should be interpreted in the same sense.

Referring to FIGS. 2 and 10, in the stereoscopic camera 500 according to the present invention, the first imaging lens assembly 10 is mounted on a main lens housing 510, and the half mirror H is mounted on a mirror box 520. The second imaging lens assembly 21 is mounted on a second imaging lens housing 590, the third imaging lens assembly 31 is mounted on a third imaging lens housing 503, and the first camera 30 is mounted on a first camera housing 540.

The second imaging lens assembly 22 is mounted on a second imaging lens housing 580, the third imaging lens assembly 41 is mounted on a third imaging lens housing 550, and the second camera 40 is mounted on a second camera housing 560.

A configuration in which when the stereoscopic camera 500 according to the present invention performs photographing, the second imaging lens assemblies 21 and 22 are moved along the optical axes, are tilted, and are panned will be described as an example. First, after the second imaging lens assembly 22 moves along the optical axis, is then tilted and panned, the position of the second imaging lens assembly 22 and the position of the second camera housing 56 are fixed. Next, after the second imaging lens assembly 21 is moved along the optical axis, is tilted and panned, the positions of the second imaging lens assembly 21 and the first camera housing 540 are fixed.

In order, the photographer manipulates the second imaging lens housing 580 to tilt and pan the second imaging lens assembly 20. FIG. 11 is a view illustrating an image obtained by enlarging a second imaging lens housing of FIGS. 9 and 10 and a cross section thereof.

Referring to FIG. 11, the second imaging lens housing 580 has a hollow cylindrical shape, and has and the second imaging lens assembly 22 arranged at one opening thereof. The outer surface of the second imaging lens housing 580 has a shape of a corrugated bellows, and a fastener is connected to the outer surface of the second imaging lens housing 580. For example, the fastener includes a bolt 581 and a nut 582. The bolt 581 is inserted into the outer surface of the second imaging lens housing 580 and is fastened to the nut 582, and a spring may be inserted between the bolt and the nut. As illustrated in FIG. 11, four bolts 581, four nuts 582, and four springs 583 may be arranged on the outer surface of the second imaging lens housing 580 at a predetermined interval.

Thus, the photographer may tighten and untighten the four bolts 581 using a driver A or the like. In this case, as the outer surface of the second imaging lens housing 580 is deformed, the second imaging lens assembly 22 forwards/rearwards moves along the optical axis or is tilted and panned.

Meanwhile, referring to FIGS. 9 and 10, the positions of the third imaging lens housing 550 and the second imaging lens housing 580 are adjusted, so that the second imaging lens assembly 22 may move along the optical axis. The stereoscopic camera 500 according to the present invention may further include a linear stage 584 configured to move the second imaging lens assembly 22 along the optical axis. The linear stage 574 is not particularly limited as long as it may linearly move the third imaging lens housing 550 and the second camera housing 560 in a state in which the second imaging lens housing 580 is fixed. Further, the widely-known linear stage may be generally used as the linear stage 574.

The stereoscopic camera 500 according to the present invention may further include a rolling means 571, a tilting means 572 and a panning means 573 such that the second imaging lens assembly 21, the first camera housing 540, and the third imaging lens housing 530 may be tilted, panned, and rolled. Here, the rolling refers to that the second imaging lens assembly 21, the first camera housing 540, and the third imaging lens housing 530, which are illustrated in FIG. 10, are rotated about the X' axis.

Although a Gonio stage disclosed in Korean Patent No. 1234346 may be used as the rolling means 571, the tilting means 572, and the panning means 573, the present invention is not limited thereto.

FIG. 12 is an exploded perspective view illustrating a Gonio stage of FIGS. 9 and 10, which is a panning, tilting, and rolling means. The same Gonio stages having different directions may be used as the panning means, the tilting means, and the rolling means. The Gonio stage, which is the panning means 571, will be described with reference to FIG. 12. An upper base 571G faces an upper surface of a lower base 571B on a curved surface, and the upper base 571G curvilinearly moves with respect to the lower base 571B. The lower surface of the upper base 571G is coupled to a connection part 571C, and the connection part 571C is connected to a movement controlling member 571A passing through the lower base 571B. Thus, the photographer may manipulate a movement of the movement controlling member 571A to curvilinearly move the upper base 571G Meanwhile, the connection part 571C moves along a guide 571H formed inside the lower base 571B.

First fixing holes 571F are formed on one side of the upper base 571G and second fixing holes 571D facing the first fixing holes 571F are formed on one side of the lower base 571B. Fixing members 571E are inserted into the first fixing hole 571F and the second fixing hole 571D to fix the position of the upper base 571G The rolling means 571, the tilting means 572, and the panning means 573 are the same in that they may minutely curvilinearly move the second imaging lens housing 590, the first camera housing 540, and the third imaging lens assembly housing 530, but have different installation directions.

Referring to FIG. 10, the rolling means 571 performs rolling by rotating the second imaging lens housing 590, the first camera housing 540, and the third imaging lens housing 530 about the X' axis. The tilting means 572 performs tilting by rotating the second imaging lens housing 590, the first camera housing 540, and the third imaging lens housing 530 about the Y' axis. The panning means 573 performs panning by rotating the second imaging lens housing 590, the first camera housing 540, and the third imaging lens housing 530 about the Z' axis.

In FIG. 10, the tilting means, the panning means, and the rolling means of the second imaging lens assembly according to the present invention are described as the Gonio stage in the first camera, and are described as the second imaging lens housing 580 having the outer surface having a shape of a bellows in the second camera. However, it is apparent to those skilled in the art that only the Gonio stage is used or only the second imaging lens housing 580 having a shape of a bellows is used.

The above-described stereoscopic camera according to the present invention may be generally mounted on not only a general camera configured to capture an image of people, insects, and backgrounds, a CCTV, a navigation, a vehicle black box, industrial inspection equipment, nondestructive testing equipment, a camera for museum exhibits or product display, an educational camera, a military camera, a drone, a smart phone, a VR/AR camera, and a PC but also an endoscope, a laparoscope, a general microscope, and a surgical microscope in which a subject is close to a lens of a stereoscopic camera.

The invention claimed is:

1. A monocular stereoscopic camera comprising:
a first imaging lens assembly;
a half mirror (H) configured to reflect a portion of a light beam passing through the first imaging leans assembly and allow the other portion of the light beam to pass therethrough;
a first camera comprising a third imaging lens assembly configured to image the light beam having been reflected by the half mirror (H);
a second camera comprising a fourth imaging lens assembly configured to image the light beam having passed through the half mirror (H); and
second imaging lens assemblies arranged on an optical axis between the first imaging lens assembly and the half mirror (H) or an optical axis between the half mirror (H) and the third imaging lens assemblies,
wherein at least one of the second imaging lens assemblies moves along an optical axis, to change focal positions of the third imaging lens assemblies or to make the size of an image of the first camera and the size of an image of the second camera be equal to each other wherein as the second imaging lens assemblies are rotated (hereinafter, referred to as "tilted") about extension lines (Y axis and Y' axis) extending in a left vertical direction with respect to the optical axes, optical axis alignment is performed, and wherein as the second imaging lens assemblies are rotated (hereinafter, referred to as "panned") about extension lines (Z axis and Z' axis) extending in a lower vertical direction with respect to the optical axes, optical axis alignment and convergence angle adjustment are performed.

2. The monocular stereoscopic camera of claim 1, wherein the second imaging lens assembly is arranged between the first imaging lens assembly and the half mirror (H), and wherein the second imaging lens assembly is a lens having an adjustable magnification, and a view angle is adjusted to minimize a vignetting phenomenon.

3. The monocular stereoscopic camera of claim 1, wherein the second imaging lens assembly is arranged between the first imaging lens assembly and the half mirror (H), and wherein the second imaging lens assemblies are arranged between the half mirror (H) and the third imaging lens assemblies.

4. The monocular stereoscopic camera of claim 1, wherein the second imaging lens assemblies are arranged between the half mirror (H) and the third imaging lens assemblies, and wherein optical axes connecting the half mirror (H) and the third imaging lens assemblies are parallel or perpendicular to each other.

5. The monocular stereoscopic camera of claim 1, wherein the second imaging lens assemblies or the third imaging lens assemblies are at least one of a macro lens capable of close-up photographing, a telephoto lens, an achromatic lens and an apochromatic lens.

6. The monocular stereoscopic camera of claim 1, further comprising:

a tilting means configured to tilt at least one of the second imaging lens assemblies; and a panning means configured to pan at least one of the second imaging lens assemblies, wherein each of the tilting means and the panning means comprises:

a lower base having one surface having a concave curved shape;

an upper base facing an upper surface of the lower base and having one surface having a convex shape; and a movement controlling member configured to curvilinearly move the upper base on the lower base.

7. The monocular stereoscopic camera of claim 1, further comprising a second imaging lens housing having the second imaging lens assemblies mounted therein and configured to align optical axes, wherein the second imaging lens housing has a hollow cylindrical shape, has the second imaging lens assembly mounted on an opening on one side thereof, and has an outer surface having a shape of a corrugated bellows, and wherein fasteners spaced apart from each other at a predetermined interval pass through the outer surface of the second imaging lens housing, and as the outer surface of the second imaging lens housing is deformed by tightening or untightening of the fasteners, the second imaging lens assemblies are panned and tilted.

8. The monocular stereoscopic camera of claim 1, further comprising: a tilting means configured to tilt at least one of the second imaging lens assemblies; and a panning means configured to pan at least one of the second imaging lens assemblies, wherein each of the tilting means and the panning means comprises: a lower base having one surface having a concave curved shape; an upper base facing an upper surface of the lower base and having one surface having a convex shape; and a movement controlling member configured to curvilinearly move the upper base on the lower base.

9. The monocular stereoscopic camera of claim 1, further comprising a second imaging lens housing having the second imaging lens assemblies mounted therein and configured to align optical axes, wherein the second imaging lens housing has a hollow cylindrical shape, has the second imaging lens assembly mounted on an opening on one side thereof, and has an outer surface having a shape of a corrugated bellows, and wherein fasteners spaced apart from each other at a predetermined interval pass through the outer surface of the second imaging lens housing, and as the outer surface of the second imaging lens housing is deformed by tightening or untightening of the fasteners, the second imaging lens assemblies are panned and tilted.

* * * * *